May 10, 1955 HO YUN RIM 2,708,091
CONVERTIBLE TYPE PILOT CONTROLLED PISTON VALVE
Filed Aug. 14, 1953
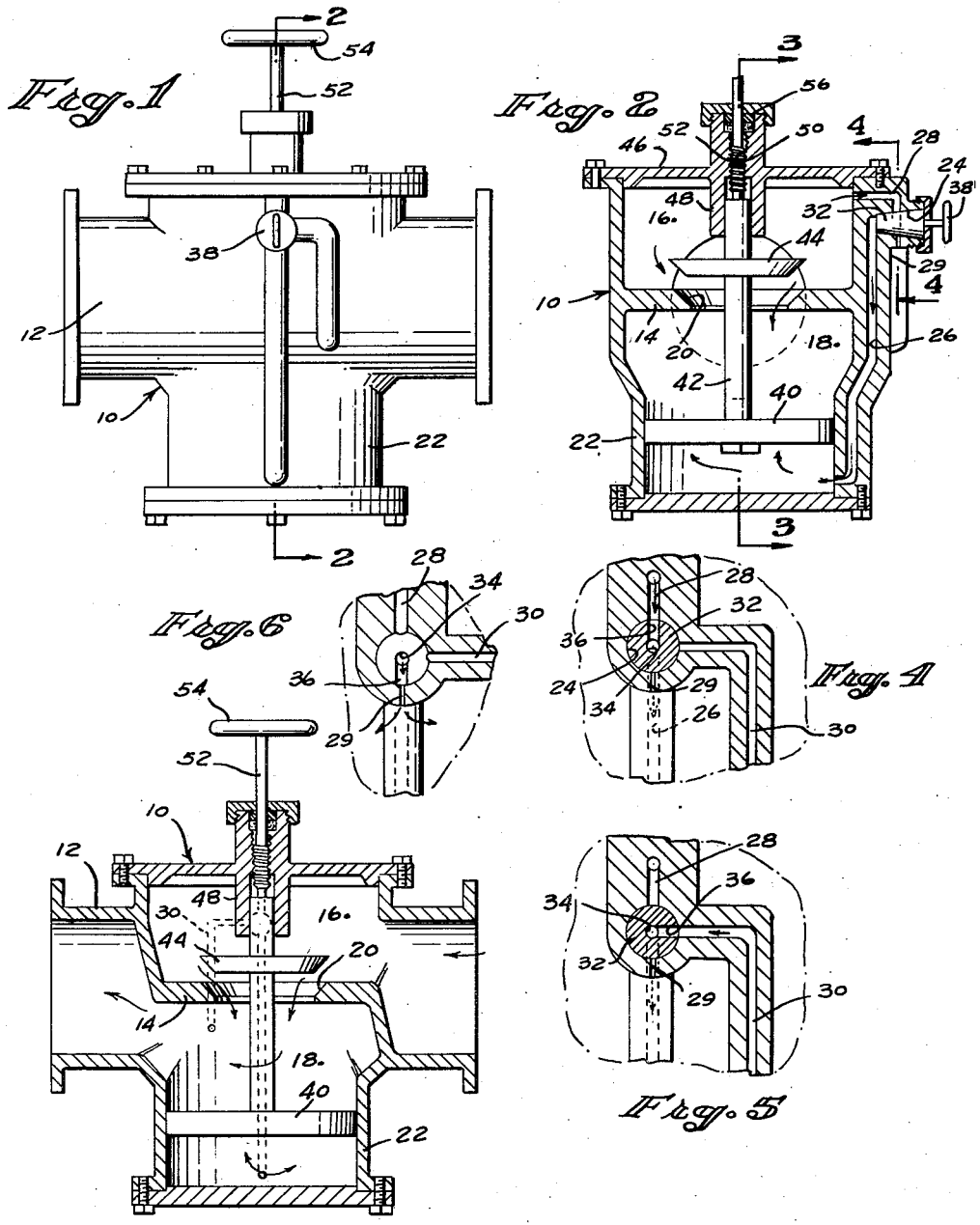
INVENTOR.
Ho Yun Rim
BY
McMorrow, Berman & Davidson
ATTORNEYS United States Patent Office 2,708,091
Patented May 10, 1955

2,708,091

CONVERTIBLE TYPE PILOT CONTROLLED PISTON VALVE

Ho Yun Rim, Yongdongpoku, Seoul, Korea

Application August 14, 1953, Serial No. 374,331

4 Claims. (Cl. 251—25)

This invention relates to a pressure actuated valve and has for its primary object to control the flow of gas through a passage.

Another object is to effect the opening or closing of the valve by the pressure of the gas controlled by the valve.

Among its features the invention embodies a valve body having a partition extending therethrough and separating the body into an inlet and an outlet or discharge chamber, said partition having an opening extending therethrough for establishing communication between the inlet and outlet chambers, a cylinder carried by the valve body and extending outwardly therefrom in concentric spaced relation to the port or passage in the partition, a piston working in said cylinder, a valve carried by the piston and operable within the inlet chamber for opening or closing the port upon movement of the piston, a bore extending into the valve body and communicating at its inner end with the cylinder adjacent the end thereof remote from the partition, a passage within the valve body and establishing communication between one side of the bore and the inlet chamber, a second passage in the valve body establishing communication between the outlet passage and the side of the bore at a point remote from the point at which the first-mentioned passage communicates with the bore, a turning plug mounted in the bore and having a passage therein which communicates through the end of the bore with the passage that leads to the cylinder and which upon turning the plug establishes communication with the inlet chamber or the discharge chamber.

In the drawings:

Figure 1 is a side view of a valve embodying the features of this invention,

Figure 2 is a sectional view taken substantially on the line 2—2 of Figure 1,

Figure 3 is a sectional view taken substantially on the line 3—3 of Figure 2,

Figure 4 is an enlarged detail sectional view taken substantially on the line 4—4 of Figure 2, Figure 5 is a view similar to Figure 4 showing the turning plug in another position, and Figure 6 is a fragmentary enlarged detail sectional view through the bore.

Referring to the drawings in detail, a valve body designated generally 10 comprises an elongated tubular portion 12 having a partition wall 14 extending therethrough which separates the interior of the body into a chamber 16 and a chamber 18. The partition wall 14 is provided with a port 20 which extends therethrough to establish communication between the chamber 16 and the chamber 18, and carried by the valve body is a cylinder 22 which projects laterally from the body in concentric spaced relation to the port 20 as will be readily understood upon reference to the drawings. Extending into the valve body above the partition and opening outwardly through said body is a tapered bore 24, the innermost end of which communicates through a passage 26 formed in the valve body with the interior of the cylinder 22 adjacent the end thereof remote from the partition 14. A passage 28 is formed in the body 10 and communicates at one end with the chamber 16 and at its opposite end with the bore 24 through the side thereof. A similiar passage 30 is formed in the body and communicates at one end with the chamber 18 and with the bore 24 through the side thereof in spaced relation to the passage 28. Opening into the bore 24 in diametrically opposed relation to the passage 28 is a drain passage 29 which communicates with atmosphere.

Mounted for turning movement in the tapered bore 24 is a turning plug 32 having a passage 34 which opens through the inner end of said plug and communicates with the passage 26 so that the cylinder 22 is always in communication with the interior of the turning plug. Formed in the turning plug and extending radially thereinto is a port 36 which opens radially through the side of the turning plug and is adapted to align with either the passage 28, the passage 30, or the drain according to the position of the turning plug. A handle 38 is carried by the turning plug in order that the port 36 can be aligned with either of the passages 28, 30, or the drain in order to selectively establish communication between the chamber 16 and the cylinder 22, the chamber 18 and the cylinder 22, or the drain and cylinder 22.

Mounted for sliding movement within the cylinder is a piston 40 which has a greater cross sectional area than the port 20 and carried by the piston 40 and extending through the port 20 is a valve stem 42. A valve 44 is carried by the stem 42 for movement therewith within the chamber 16 so that when the piston 40 moves downwardly in its cylinder 22, the valve 44 will seat against the partition 14 to close the port 20.

The upper end of the valve body enclosing the chamber 16 is closed by a suitable cover 46, and carried by the cover 46 and projecting into the chamber 16 is a tubular guide 48 in which the upper end of the valve stem 42 is mounted for sliding movement. It will thus be seen that the valve 44 will be held by the piston 40 and guide 48 in proper alignment with the relation to the port 20. Extending through the cover 46 in axial alignment with the sleeve 48 is an internally screw threaded opening 50 with which is threadedly engaged an externally screw threaded shaft 52, the inner end of which extends into the tubular sleeve 48 to form a stop which will limit the movement of the valve stem 42 and consequently the distance that the valve 44 may move away from the partition 14 during the opening thereof. The shaft 52 projects upwardly beyond the top of the cover 46 and is provided with a hand wheel 54 by means of which the shaft may be rotated to adjust it longitudinally relative to the sleeve 48 and thereby select the distance to which the valve 44 moves relative to the partition 14. A suitable packing gland 56 may be employed about the shaft 52 to prevent the escape of gas through the opening 50.

In use with the valve coupled to a pressure line and a discharge line, gas pressure entering the chamber 16 will when the valve is open flow through the port 20 into the chamber 18. Upon turning the turning plug 32 by the handle 38, the port 36 may be moved to communicate with the passage 30 to thereby permit the discharge of gas from the cylinder 22 below the piston into the chamber 18 through said passage 30, or the port 36 may be moved to communicate with the drain 29. Such discharge of the gas pressure from below the piston 40 will permit the piston to move downwardly under the influence of the pressure of the gas in the chamber 18 to seat the valve 44 on the partition 14 and close the port 20 to thereby cut off the flow of gas through the valve. When it is again desired to open the valve, the turning plug 32 is rotated in the bore 24 to align the port 36 thereof with the passage 28 to thereby establish communication between the chamber 16 and the cylinder 22 below the piston. Owing to the fact that the piston is of greater cross sectional area than the valve 44 it will be evident that the gas reacting against the piston will lift the valve 44 out of contact with the partition 14 to thus open the port 20 and permit the flow of gas through the valve. By adjusting the distance that the shaft 52 enters the guide sleeve 48 it will be obvious that the distance to which the valve 44 is moved away from the partition 14 may be regulated and consequently the volume of gas discharged through the port 20 may also be governed. By turning the plug 32 to align the port 36 with the passage 29 it will be evident that a stand pipe or like equipment coupled to the chamber 18 may be drained of its contents through a uniflow piston seal, so as to avoid freezing.

The flow of gas pressure may be from the chamber 18 to the chamber 16, and in this case, the chamber 18 will become the high pressure chamber. In this case, with the valve 44 seated in the partition 14 to close the port 20, by turning the handle 38 of the plug 32 so that the port 36 is brought into communication with the passage 30, the gas pressure will flow from the chamber 18 through passage 30 through port 36 in the plug 32, thence into passage 26, and thence into the cylinder 22 below the piston 40, to cause the piston to move upwardly and move the valve 44 off its seat in the partition 14 and open the port 20 to thereby permit the gas pressure to flow into and out of chamber 16. When the valve 44 is moved away from seating in the partition 14 and the port 20 opens the gas pressure flows from chamber 18 through port 20 into chamber 16 and out of the tubular portion 12. On the other hand, with the plug 32 rotated to a position such that the port 36 of the plug 32 is in communication with the passage 28, Fig. 4, the gas pressure also flows from the chamber 16 through passage 28, port 36, passage 26 and into the cylinder 22 below the piston 40, thereby exerting a pressure upon piston 40 sufficient to maintain the valve 44 in its open position. However, should an increase in pressure develop in chamber 18 due to resurgence or reversal of the flow of the pressure, such increased pressure will act upon the upper surface of the piston 40 and overcome the gas pressure below the piston 40 and cause a downward movement of the piston in the cylinder 22 and a corresponding movement of the valve 44 toward and into seating engagement with the partition 14 and closing of the port 20, the port 20 being closed until the excessive pressure has been drained out of chamber 18, at which time the pressure below the piston 40 takes over and causes upward movement of the piston and simultaneous movement of the valve 44 out of seating engagement with the partition 14 and opening of the port 20. With the port 36 in communication with the passage 30, Figure 5, and the flow taking place from chamber 18 to chamber 16, should an increased pressure occur in chamber 16 due to reverse flow or other causes, such increased pressure will act upon the upper surface of the valve 44 and of the piston 40 and overcome the gas pressure below the piston 40 and cause downward movement of the piston into the cylinder 22 and a corresponding movement of the valve 44 toward and into seating engagement with the partition 14 and closing the port 20, the port 20 being closed until the excessive pressure has been drained out of the chamber 16, at which time the pressure below the piston 40 takes over and causes upward movement of the piston and simultaneous movement of the valve 44 out of seating engagement with the partition 14 and opening the port 20.

While in the foregoing there has been shown and described the preferred embodiment of this invention, it is to be understood that minor changes in the details of construction, combination and arrangement of parts may be resorted to without departing from the spirit and scope of the invention as claimed.

What is claimed is:

1. A pressure actuated valve comprising a hollow valve body, a partition wall carried by and extending across the interior thereof to separate the body into a pair of chambers, said partition wall having a port extending therethrough and establishing communication between said chambers, a cylinder carried by the valve body in axial alignment with the port, a piston mounted in the cylinder for movement toward and away from the partition wall, a valve carried by the piston and operable within one of said chambers to move with the piston into and out of closing relation to the port, said valve being of lesser cross sectional area than the piston, said valve body having a bore extending thereinto which has a tapered portion at its outer end and which communicates through its inner end with the cylinder adjacent the end thereof remote from the partition, said body having a passage therein which establishes communication between said one chamber and the tapered portion on one side thereof, said body also having a passage therein which establishes communication between the other of said chambers and the tapered portion in spaced relation to the first mentioned passage, said body having a drain passage therein which communicates with the tapered portion and atmosphere, and a manually actuated tapered turning plug mounted in the tapered portion and having a port therein which selectively establishes communication between the cylinder and said one chamber, the cylinder and said other chamber, or the cylinder and the drain.

2. A pressure actuated valve comprising a hollow valve body, a partition wall carried by and extending across the interior thereof to separate the body into a pair of chambers, said partition wall having a port extending therethrough and establishing communication between said chambers, a cylinder carried by the vlave body in axial alignment with the port, a piston mounted in the cylinder for movement toward and away from the partition wall, a valve stem carried by the piston for movement therewith through the port, a valve carried by the valve stem for movement thereby within one of said chambers into and out of closing relation to the port, said valve being of lesser cross sectional area than the piston, said valve body having a bore extending thereinto which has a tapered portion at its outer end and which communicates through its inner end with the cylinder adjacent the end thereof remote from the partition, said body having a passage therein which establishes communication between one side of the tapered portion and said one chamber, said body also having a passage therein which establishes communication between the other of said chambers and the tapered portion in spaced relation to the first mentioned passage, said body having a drain passage therein which communicates with the tapered portion and atmosphere, a manually actuated tapered turning plug mounted in the tapered portion and having a port therein which selectively establishes communication between the cylinder and said one chamber, the cylinder and said other chamber, or the cylinder and the drain, and means carried by the valve body and projecting thereinto above the valve stem for engaging the valve stem and limiting the movement of the valve away from the partition.

3. A pressure actuated valve comprising a hollow valve body, a partition wall carried by and extending across the interior thereof to separate the body into a pair of chambers, said partition wall having a port extending therethrough and establishing communication between said chambers, a cylinder carried by the valve body in axial alignment with the port, a piston mounted in the cylinder for movement toward and away from the partition wall, a valve stem carried by the piston for movement therewith through the port, a valve carried by the valve stem for movement thereby within one of said chambers into and out of closing relation to the port, said valve being of lesser cross sectional area than the piston, said valve body having a bore extending thereinto which has a tapered portion at its outer end and which communicates through its inner end with the cylinder adjacent the end thereof remote from the partition, said body having a passage therein which establishes communication between one side of the tapered portion and said one chamber, said body also having a passage therein which establishes communication between the other of said chambers and the tapered portion in spaced relation to the first mentioned passage, said body having a drain passage therein which communicates with the tapered portion and atmosphere, a manually actuated tapered turning plug mounted in the tapered portion and having a port therein which selectively establishes communication between the cylinder and said one chamber, the cylinder and said other chamber, or the cylinder and the drain, and a tubular guide carried by the valve body and extending toward the partition for receiving the valve stem and cooperating with the piston in guiding the valve.

4. A pressure actuated valve comprising a hollow valve body, a partition wall carried by and extending across the interior thereof to separate the body into a pair of chambers, said partition wall having a port extending therethrough and establishing communication between said chambers, a cylinder carried by the valve body in axial alignment with the port, a piston mounted in the cylinder for movement toward and away from the partition wall, a valve stem carried by the piston for movement therewith through the port, a valve carried by the valve stem for movement thereby within one of said chambers into and out of closing relation to the port, said valve being of lesser cross sectional area than the piston, said valve body having a bore extending thereinto which has a tapered portion at its outer end and which communicates through its inner end with the cylinder adjacent the end thereof remote from the partition, said body having a passage therein which establishes communication between one side of the tapered portion and said one chamber, said body also having a passage therein which establishes communication between the other of said chambers and the tapered portion in spaced relation to the first mentioned passage, said body having a drain passage therein which communicates with the tapered portion and atmosphere, a manually actuated tapered turning plug mounted in the tapered portion and having a port therein which selectively establishes communication between the cylinder and said one chamber, the cylinder and said other chamber, or the cylinder and the drain, and a tubular guide carried by the valve body and extending toward the partition for receiving the valve stem and cooperating with the piston in guiding the valve, and an adjustable stop threadedly engaging the body and extending into the tubular guide for engaging the valve stem and limiting the movement of the valve away from the partition.

References Cited in the file of this patent
UNITED STATES PATENTS

| | | |
|---|---|---|
| 845,063 | Desper | Feb. 26, 1907 |
| 1,005,117 | Judell | Oct. 3, 1911 |
| 2,532,123 | Shafer | Nov. 28, 1950 |
| 2,624,365 | Hesson | Jan. 6, 1953 |